July 31, 1934. W. SHURTLEFF Re. 19,260

AIR FILTER FOR HEATING AND VENTILATING UNITS

Original Filed April 16, 1925 2 Sheets-Sheet 1

Witness:
Chas. L. Kourek

Inventor,
Wilfred Shurtleff,
Offield, Mehl & Wheelwright
Attys.

July 31, 1934. W. SHURTLEFF Re. 19,260

AIR FILTER FOR HEATING AND VENTILATING UNITS

Original Filed April 16, 1925 2 Sheets-Sheet 2

Witness:
Chas. R. Koursh.

Inventor,
Wilfred Shurtleff
by Pennie, Davis, Marvin & Edmonds
Attys.

Reissued July 31, 1934 Re. 19,260

UNITED STATES PATENT OFFICE 19,260

AIR FILTER FOR HEATING AND VENTILATING UNITS

Wilfred Shurtleff, Moline, Ill., assignor to The Herman Nelson Corporation, Moline, Ill., a corporation of Illinois Original No. 1,887,737, dated November 15, 1932, Serial No. 23,523, April 16, 1925. Application for reissue November 16, 1933, Serial No. 698,281

15 Claims. (Cl. 257—137)

This invention relates to improvements in air filters for heating and ventilating apparatus, and more particularly to devices of the character described adapted to be supported within such units for removing dust and other impurities from the air drawn into the apparatus from the outside atmosphere, and discharged into the room in which the same is located.

The object of the invention is to provide an improved construction for filtering devices for the purpose described whereby an increased filtering surface is obtained and by a novel method for supporting the same within the housing of the apparatus to provide a simple and inexpensive arrangement which is readily accessible for removal and renovation of the filtering material. The ventilating and heating apparatus of a typical design illustrated in the accompanying drawings, discloses a preferred embodiment of the invention.

Another object is to provide an arrangement wherein an internal wall, in conjunction with the casing of the apparatus, provides a heated air passage and a by-pass passage for cold air, both passages receiving a portion of the discharge from a blower positioned below the internal wall, and bending forwardly so that a stream of cold air will be discharged by the by-pass passage above the stream of warm air discharged by the heated air passage.

Referring to the drawings.

Figure 1:
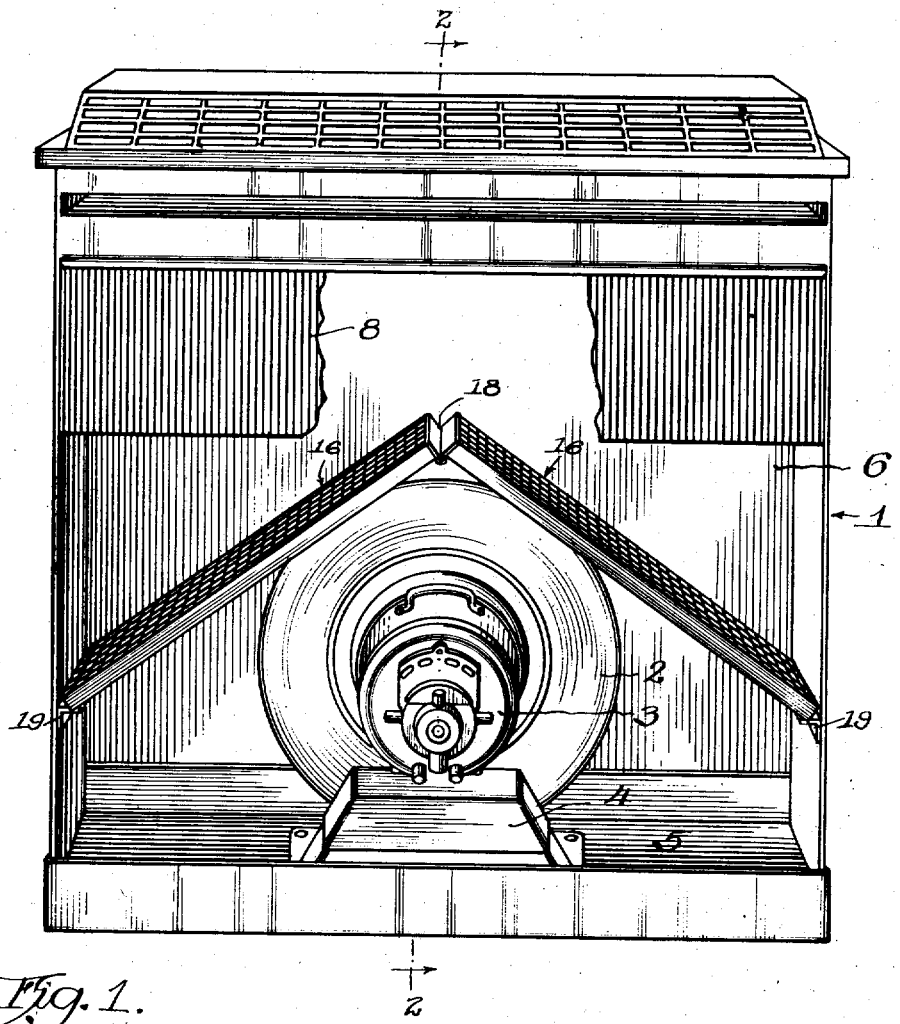
Figure 1 is a front view of the apparatus with the front wall removed.
Figure 4:
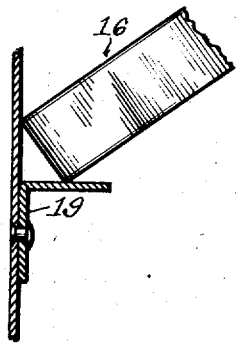
Figure 4 is a detail view of the filter support.
Figure 2:
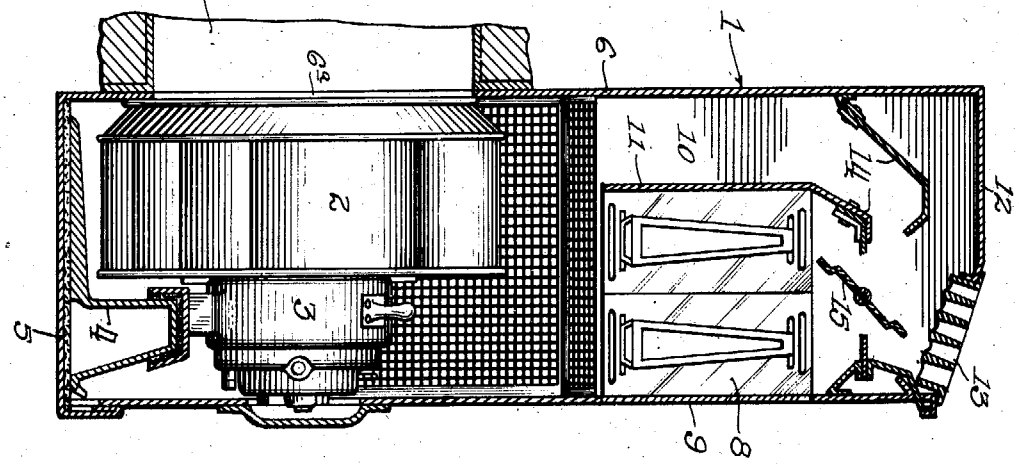
Figure 2 is a view of the apparatus in vertical section, taken on line 2—2 of Figure 1.

The apparatus in which the filtering device is located consists in general of an upright cabinet or housing, adapted to rest upon the floor of the room, and against the outer wall thereof. In the lower part of the cabinet is a propeller fan 2, directly connected with a motor 3, mounted on a base 4, resting on the bottom wall 5, of the cabinet. The fan faces toward the rear wall 6 of the cabinet, with its intake side registering with a circular opening 6ª therein which in turn registers with a horizontal duct 7 through the wall of the building and communicating with the outside atmosphere.

Above the fan is a radiator 8 extending horizontally the length of the cabinet along the front wall 9 thereof. Between the radiator and the rear wall 6 is a vertical passage 10 with a vertical baffle plate 11 adjacent the radiator. Between the radiator 8 and the wall 11 is a second radiator 8a, extending alongside the radiator 8. Above the radiator and extending along the forward edge of the top wall 12 is a discharge outlet in the form of a grille 13 slightly inclined to the horizontal so as to direct the air outwardly as well as vertically. Suitable baffle plates 14—14 and a damper 15 regulate the passage of air upwardly from the fan, provision being thus made for the passage of all of the air through the radiator, or part through the radiator and part through the passage 11, for the purpose of regulating the temperature of the air delivered into the room.

Referring now to the filtering device, the same consists of two hinged together sections 16—16 extending lengthwise of the cabinet, between the fan and the radiator, and arching over the fan. Each section 16 is a flat rectangular frame of a suitable construction, being preferably of metal with the top and bottom walls of woven wire or a coarse mesh.

Figure 3:
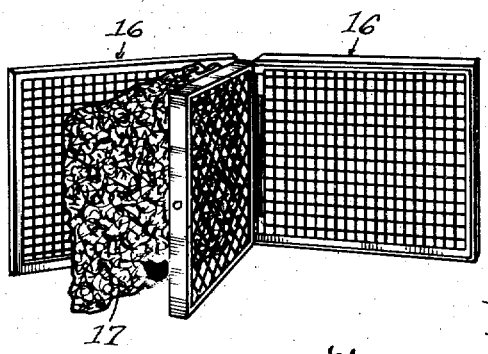
Figure 3 is a perspective view of the filtering device removed.

As clearly shown in Figure 3, each section is made in two parts, which normally fit together, but are separable so that the layer or blanket 17 of filtering material may be removed for the purpose of cleaning or replacement. The frame sections 16—16 are hinged together at their ends, as at 18, so that they may be folded together for convenience in removing the same from the cabinet. In operative position the sections are self-supporting, that is, they form an arch with their opposite ends supported against the opposite end walls of the cabinet with their hinge edges being located just above the fan and just below the radiator. Narrow ledges 19—19 consisting of lengths of angle iron riveted to the end walls of the cabinet about midway the height of the fan, support the ends of the sections. In this way the sections support themselves at an obtuse angle to each other against the end walls. Manifestly the position of the filtering member is such that all of the air drawn into the cabinet and propelled upwardly by the fan must pass through the filter before passing through the radiator or passage 10, and thence delivered into the room.

The front wall 9 of the cabinet is ordinarily removable to permit access to the fan and motor, and hence the filtering member can be readily withdrawn, when it is necessary to clean the filtering material, the hinged sections making it a simple matter to accomplish. Furthermore, the two hinged sections make it possible to arch the frames over the fan, not only affording a convenient and simple method of supporting the device, but securing the added advantage of increased filtering area due to the inclination of the two sections to the horizontal.

There are several advantages in the construction and method of mounting the filter in the cabinet to which attention may be directed.

It is customary in filtering devices of this character to saturate the filtering material with a suitable kind of oil, for the purpose of facilitating the filtering action, and as a result there is more or less dripping of the excess oil from the filter. With the arched form of filter, the oil works toward the lower ends of the frames, and thence down the inside walls of the cabinet, and not onto the fan and motor as would be the case if the screen extended longitudinally across the cabinet.

Furthermore, the hinged frame construction and arched arrangement of the sections, avoids the necessity for accurately dimensioning the filter to fit the cabinet, since any slight variations are taken up in the angular displacement of the sections when the screens are inserted into the cabinet. In other words, the filters adjust themselves to the cabinet, and require only a flange at each end to support them. Ease of removal and replacement is also another important advantage that is due to the arched construction.

I claim as my invention:

1. In a heating and ventilating unit of the character described, the combination with a housing having an inlet adjacent its bottom and an outlet adjacent its top; a fan in the bottom of said housing adapted to draw air from the adjacent opening and to discharge said air upwardly; of means in the upper end of said housing providing a heating chamber and a passageway, both of which extend from one side to the other of said housing, said passageway and heating chamber being open at the upper ends to discharge through the outlet in the upper portion of the housing and being open at the lower ends and disposed in spaced relation with respect to said fan; radiators disposed in said heating chamber and confined thereto; a filtering unit removably supported in said housing and comprising hinged frames arranged at an obtuse angle to each other to form an arch over said fan, the ends of said frames being supported against the opposite side walls of said housing, said filtering unit spanning the distance between the defining walls of the housing and entirely separating said fan from the heating chamber and passageway, whereby an increased area of filtering surface is provided for filtering all of the air prior to its passage through the heating chamber or passageway in the upper portion of said housing.

2. In a heating and ventilating unit of the character described, the combination of a housing having an inlet adjacent its bottom and an outlet adjacent its top, a fan in the bottom of said housing adapted to draw air from the adjacent opening and to discharge said air upwardly; of means in the upper end of said housing providing a separated heating chamber and a passageway, said passageway and heating chamber discharging through the outlet in the upper portion of the housing and having their open ends disposed in spaced relation to said fan and in position to receive air discharged therefrom, radiators disposed in said heating chamber, a filtering unit removably supported in said housing and comprising hinged frames arranged at an obtuse angle to each other to form an arch over said fan, the ends of said frames being supported against the opposite side walls of said housing, said filtering unit spanning the distance between the defining walls of the housing and entirely separating said fan from the heating chamber and passageway, whereby an increased area of filtering surface is provided for filtering all of the air prior to its passage through the heating chamber or passageway in the upper portion of said housing.

3. In a heating and ventilating unit of the character described, the combination of a housing having an inlet adjacent its bottom and an outlet adjacent its top a fan in the bottom of said housing adapted to draw air from the adjacent opening and to discharge said air upwardly; of means in the upper end of said housing providing a separated heating chamber and a passageway, said passageway and heating chamber discharging through the outlet in the upper portion of the housing and having their open ends disposed in spaced relation to said fan and in position to receive air discharged therefrom, radiators disposed in said heating chamber, a filtering unit removably supported in said housing and comprising frame members arranged to form an arch over said fan, the ends of said frames being supported against the opposite side walls of said housing, said filtering unit spanning the distance between the defining walls of the housing and entirely separating said fan from the heating chamber and passageway, whereby an increased area of filtering surface is provided for filtering all of the air prior to its passage though the heating chamber or passageway in the upper portion of said housing.

4. A heating and ventilating unit comprising an enclosing casing having an inlet chamber at its bottom, a discharge chamber at its top, heating and by-pass chambers between the top and bottom chambers; a blower disposed in a chamber below the heating and by-pass chambers and adjacent the inlet chamber; and a filter arranged in the casing below the heating chamber whereby fresh air entering the inlet chamber may pass through the filter before entering the heating chamber.

5. A heating and ventilating unit comprising an inclosing casing having an inlet chamber, a discharge chamber, heating and by-pass chambers; a blower chamber; a blower therein and filtering means disposed between said blower and by-pass chambers in the path of the air through the unit and adapted to clean the air during its passage to the heating and by-pass chambers.

6. A heating apparatus comprising a casing including rear and top walls, having an inlet opening adjacent its base and an outlet opening adjacent its top, an internal wall positioned in adjacent parallel spaced relation to the rear wall of the casing, and provided with an upper forwardly extended portion positioned in spaced relation to the top wall of the casing, thereby forming a cold air passage between said internal wall and the rear wall of the casing and above said forwardly extended portion and a heated air passage forwardly of said internal wall, a heat unit disposed in said heated air passage, and means for creating currents of air through both of said passages.

7. A heating apparatus comprising a casing including rear and top walls, having an inlet opening adjacent its base and an outlet opening adjacent its top, an internal wall positioned in adjacent spaced relation to the rear wall of the casing, and provided with an upper forwardly extended portion positioned in spaced relation to the top wall of the casing, thereby forming a cold air passage between said internal walls and the rear wall of the casing and above said forwardly extended portion and a heated air passage forwardly of said internal wall, a heat unit disposed in said heated air passage, and a blower positioned adjacent the lower extremity of said internal wall and discharging into both of said passageways.

8. A heating apparatus comprising a casing including rear and top walls, having an inlet opening adjacent its base and an outlet opening adjacent its top, an internal wall positioned in adjacent spaced relation to the rear wall of the casing, and provided with an upper forwardly extended portion positioned in spaced relation to the top wall of the casing, thereby forming a cold air passage between said internal wall and the rear wall of the casing and above said forwardly extended portion and a heated air passage forwardly of said internal wall, a heat unit disposed in said heated air passage, and a blower positioned adjacent the lower extremity of said internal wall and discharging into both of said passageways, said inner wall completely shielding the heat unit from the rear wall.

9. A heating apparatus comprising a casing including a rear wall, having an inlet opening adjacent its base and an outlet opening adjacent its top, an upper baffle wall extended forwardly from the upper region of said rear wall, an internal wall positioned in adjacent parallel spaced relation to the rear wall of the casing, and provided at its upper end with a forwardly extended portion constituting a lower baffle wall positioned in adjacent, spaced relation to said upper baffle wall, thereby forming a cold air passage between said internal wall and the rear wall of the casing and said upper baffle wall and a heated air passage forwardly of said internal wall, a heat unit disposed in said heated air passage, and a single means for creating currents of air through both of said passages.

10. A heating apparatus comprising a casing including a rear wall, having an inlet opening adjacent its base and an outlet opening adjacent its top, an upper baffle wall extended forwardly from the upper region of said rear wall, an internal wall positioned in adjacent parallel spaced relation to the rear wall of the casing, and provided at its upper end with a forwardly extended portion constituting a lower baffle wall positioned in adjacent, spaced relation to said upper baffle wall, thereby forming a cold air passage between said internal wall and the rear wall of the casing and said upper baffle wall and a heated air passage forwardly of said internal wall, a heat unit disposed in said heated air passage, and a blower positioned adjacent the lower extremity of said internal wall and discharging into both passageways, said inner wall completely shielding the heat unit from the rear wall.

11. A heating apparatus comprising a casing including a rear wall, having an inlet opening adjacent its base and an outlet opening adjacent its top, an upper baffle wall extended upwardly and forwardly from the upper region of said rear wall, an internal wall positioned in adjacent parallel spaced relation to the rear wall of the casing, and provided at its upper end with an upwardly and forwardly extended portion constituting a lower baffle wall positioned in adjacent, spaced relation to said upper baffle wall, thereby forming a cold air passage between said internal wall and the rear wall of the casing and said upper baffle wall and a heated air passage forwardly of said internal wall, a heat unit disposed in said heated air passage, and a blower positioned adjacent the lower extremity of said internal wall and discharging into both passageways, said inner wall completely shielding the heat unit from the rear wall.

12. A heating apparatus comprising a casing having an inlet opening adjacent its base and an outlet opening adjacent its top, said casing including a rear wall, a wall member extended forwardly from the upper region of said rear wall, an internal wall positioned in adjacent spaced parallel relation to said rear wall, and provided at its upper end with a forwardly extended wall portion positioned in adjacent spaced relation to said wall member, thereby forming a cold air passage between said internal wall and the rear wall and said wall member, and a heated air passage forwardly of said internal wall, a heating element disposed in said heated air passage, and a single means for creating forced currents of air through both of said passages, said internal wall completely shielding the heat unit from the rear wall.

13. A heating apparatus comprising a casing having an inlet opening adjacent its base and an outlet opening adjacent its top, said casing including a rear wall, a wall member extended forwardly from the upper region of said rear wall, an internal wall positioned in adjacent spaced parallel relation to said rear wall, and provided at its upper end with a forwardly extended wall portion positioned in adjacent spaced relation to said wall member, thereby forming a cold air passage between said internal wall and the rear wall and said wall member, and a heated air passage forwardly of said internal wall, a heating element disposed in said heated air passage, and a single means for creating forced currents of air through both of said passages, the current of air passing through said cold air passage serving to absorb heat conducted through said internal wall, and to project said absorbed heat through the discharge opening whereby all of the heat produced by said element will be projected into the room in the air stream issuing from the heater.

14. In a heating and ventilating unit of the character described, the combination with a housing having an inlet adjacent its bottom and an outlet adjacent its top and adjacent its front side; a fan in the bottom of said housing adapted to draw air from the adjacent opening and to discharge said air upwardly; of means in said housing providing a heating chamber and a cold air passageway, both discharging through said outlet and having open lower ends disposed in spaced relation to said fan and in position to receive air discharged from said fan, said cold air passage extending upwardly between said heating chamber and the rear wall of the housing and thence bent forwardly above said heating chamber so as to provide a forced stream of air insulating said heating chamber from and preventing transmission of heat to the rear and top walls of the housing.

15. In a heating and ventilating unit of the character described, the combination with a housing having an inlet adjacent its bottom and an outlet adjacent its top and adjacent its front side; a fan in the bottom of said housing adapted to draw air from the adjacent opening and to discharge said air upwardly; of means in said housing providing a heating chamber and a cold air passageway, both discharging through said outlet and having open lower ends disposed in position to receive air discharged from said fan, said cold air passage extending upwardly between said heating chamber and the rear wall of the housing and thence bent forwardly above said heating chamber so as to provide a forced stream of air insulating said heating chamber from and preventing transmission of heat to the rear and top walls of the housing.

WILFRED SHURTLEFF.